United States Patent [19]

Chianelli et al.

[11] 4,288,422

[45] Sep. 8, 1981

[54] METHOD OF PREPARING CHALCOGENIDES OF GROUP VIII BY LOW TEMPERATURE PRECIPITATION FROM MONAQUEOUS SOLUTION, THE PRODUCTS PRODUCED BY SAID METHOD AND THEIR USE AS CATALYSTS

[75] Inventors: Russell R. Chianelli, North Branch; Theresa A. Pecoraro, Middletown, both of N.J.

[73] Assignee: Exxon Research & Engineering Co., Florham Park, N.J.

[21] Appl. No.: 160,106

[22] Filed: Jun. 16, 1980

Related U.S. Application Data

[63] Continuation of Ser. No. 14,589, Feb. 23, 1979, abandoned, which is a continuation of Ser. No. 797,011, May 16, 1977, abandoned.

[51] Int. Cl.$^3$ .................. C01B 19/04; C01G 3/12; C01G 55/00
[52] U.S. Cl. .................................. 423/509; 423/22; 423/561 R; 252/439; 252/306; 252/309
[58] Field of Search ............ 423/22, 508, 509, 561 R; 252/439, 306, 309, 313, 317

[56] References Cited

U.S. PATENT DOCUMENTS

| | | | |
|---|---|---|---|
| 1,948,408 | 2/1934 | Watts et al. ........................ | 252/439 |
| 2,145,657 | 1/1939 | Ipatieff et al. ..................... | 208/143 |
| 2,354,742 | 8/1944 | Cunningham ....................... | 423/509 |
| 2,448,740 | 9/1948 | Schwartz ............................ | 252/313 |
| 2,647,858 | 8/1953 | Weisz ................................. | 208/313 |
| 2,654,696 | 10/1953 | La Porte ............................ | 208/264 |
| 2,805,717 | 9/1957 | Nitsche .............................. | 423/509 |
| 2,902,360 | 9/1959 | Juda .................................. | 75/84 |
| 3,026,175 | 3/1962 | Kulifay .............................. | 423/509 |
| 3,140,994 | 7/1964 | Derr et al. .......................... | 208/254 |
| 3,161,585 | 12/1964 | Gleim et al. ........................ | 208/254 |
| 3,252,894 | 5/1966 | Gatsis et al. ....................... | 208/264 |
| 3,252,895 | 5/1966 | Gleim ................................. | 208/264 |
| 3,275,567 | 9/1966 | Keith et al. ......................... | 252/439 |
| 3,291,720 | 12/1966 | Dobres et al. ....................... | 208/89 |
| 3,306,701 | 2/1967 | Anderson et al. ................... | 423/509 |
| 3,320,157 | 5/1967 | Arey, Jr. et al. ................... | 423/561 X |
| 3,331,769 | 7/1967 | Gatsis ................................ | 208/210 |
| 3,336,386 | 8/1967 | Dovell et al. ....................... | 260/576 |
| 3,338,822 | 8/1967 | Groszek .............................. | 208/310 |
| 3,441,500 | 4/1969 | Wunderlich ........................ | 208/213 |
| 3,453,217 | 7/1969 | Kozlowski et al. ................. | 252/430 |
| 3,509,213 | 4/1970 | Greenfield et al. ................. | 260/563 |
| 3,538,161 | 10/1970 | Dovell ................................ | 252/439 |
| 3,538,162 | 11/1970 | Dovell ................................ | 260/576 |
| 3,622,497 | 11/1971 | Gleim ................................. | 208/108 |
| 3,622,498 | 11/1971 | Stolfa et al. ........................ | 208/108 |
| 3,657,111 | 4/1972 | Gleim ................................. | 208/108 |
| 3,663,341 | 5/1972 | Wagner ............................... | 208/143 |
| 3,667,970 | 7/1972 | Mertzweller et al. .............. | 252/431 |
| 3,682,813 | 8/1972 | Dun et al. .......................... | 208/59 |
| 3,686,137 | 8/1972 | Gatti .................................. | 252/437 |
| 3,694,532 | 9/1972 | Gleim et al. ........................ | 208/215 |
| 3,714,339 | 1/1973 | Vecht ................................. | 423/509 |
| 3,761,397 | 9/1973 | Gatti .................................. | 208/143 |
| 3,761,425 | 9/1973 | Baessler et al. .................... | 252/439 |
| 3,763,043 | 10/1973 | Thompson ........................... | 423/561 R |
| 3,766,064 | 10/1973 | Gamble et al. ..................... | 252/25 |
| 3,793,081 | 2/1974 | Varga ................................. | 136/86 D |
| 3,840,389 | 10/1974 | Kobylinski et al. ................. | 423/561 |
| 3,850,864 | 11/1974 | Kravitz et al. ..................... | 252/439 |
| 3,915,842 | 10/1975 | Gatsis ................................ | 252/439 |
| 3,920,743 | 11/1975 | Baessler et al. .................... | 260/580 |
| 4,009,052 | 2/1977 | Whittingham ...................... | 429/191 |
| 4,055,630 | 10/1977 | McCoy et al. ...................... | 423/509 |
| 4,208,394 | 6/1980 | Chianelli et al. ................... | 423/561 R |

FOREIGN PATENT DOCUMENTS

| | | |
|---|---|---|
| 1767190 | 10/1971 | Fed. Rep. of Germany . |
| 728913 | 7/1932 | France . |
| 735295 | 11/1932 | France . |
| 2034431 | 12/1970 | France . |
| 358180 | 10/1931 | United Kingdom . |
| 362345 | 10/1931 | United Kingdom . |
| 1123136 | 8/1968 | United Kingdom . |
| 1471589 | 4/1977 | United Kingdom . |

OTHER PUBLICATIONS

Jolly, "The Synthesis and Characterization of Inorganic Compounds", Prentice–Hall, Inc., 1970, pp. 97–101, 104, 109, 110, 113 and 116–121.

Biltz et al., "Uber die Sulfide des Iridiums", Z. Anorganische und Allgemiene Chemie, 233: pp. 257–281 (1937).

Lutz et al., "Preparation of Metal Sulfides from Organic Solvents", Z. Naturforsch., B., 1971 26(11), 1096–1097.

Jaeger, "Collodial Sulfur Compounds of Ruthenium", Proc. Acad. Sci. Amster., pp. 95–102 (1920).

Alibegoff, "Ueber Uranverbindungen", Annalen die Chemie, 233: pp. 117–143 (1886).

Wildervanck et al., "Preparation and Crystallinity of Molybdenum and Tungsten Sulfides", Zeitschrift fur Anorganischen and Allgemeine Chemie, Band 328, 1964, pp. 309–318.

DeJong et al., "La Combanaison $RuS_2$ et Sa Structure", Rec. Trav. Chim., 46: pp. 173–176 (1927).

Juza et al., "Beitrage zur systematischen Verwandtschaftslehre. 66. Uber die Sulfide des Rhodiums", Z. Anorg. Allgem. Chem. 225: pp. 369–385 (1935).

Biltz, "Notiz uber Selenide und Telluride von Iridium und Rhodium", Z. Anorg. Allgem. Chemie, 233: 282–285 (1937).

Hofman et al., "Crystalline Polysulfides of Heavy Metals", Berichte, 37, 245 (1904).

Hofman et al., "Crystalline Polysulfides of Heavy Metals", Berichte, 36, 3090 (1903).

Broadbent et al., "Rhenium Sulfides as Liquid Phase Hydrogenation Catalysts, A Comparison with Molybdenum Sulfide & Cobalt Polysulfide", JACS, 1954, pp. 1519–1523.

Uelsmann, "Feber unige den Sulfiden und Schwefebasen analoge Selenverbindungen", Annalen der Chemie, 116, pp. 122–127 (1860).

Plovnick et al., "Preparation & Properties of Some Ternary Selenides and Tellurides of Rhodium", Inorganic Chemistry 7, No. 12, pp. 2596–2598 (1968).

Munson et al., "A High-Pressure Form of Palladium Disulfide", Inorganic Chemistry 8, No. 5, pp. 1198–1199, May 1969.

Jackson et al., "Critical Examination of Platinum Sulfide Precipitation", Analytical Chemistry, 22, No. 6, pp. 813-817, Jun. 1950.
Pitwell, "Thiomolybdates of the Group-Eight Metals", Nature, 207, 1181-1182 (1965).
Strotzer et al., "Uransulfide", Zeitschrift fur Anorganische und Allgemeine Chemie, 243, pp. 307-321 (1949).
Korolev, "The Role of Iron Sulfides in the Accumulation of Molybdenum in Sedimentary Rocks of the Reduced Zone", Geochemistry, No. 4, pp. 452-463 (1958).
Ponomarev et al., "Some Properties of Thiomolybdic Solutions", Sbornik Nauch. Trudov, Kazakh, Gorno-Met. Inst. Geol. Gorneo Delo. Met. No. 16, pp. 369-376 (1959) Abstract only.
Wilke-Dorfurt, "Zor Reindarstellung von Uranverbindurgen", Wessenschaftliche Veroffetl Siemens Werken, vol. 1, 143-146 (1920).
Biltz et al., "Notiz uber MoS$_3$"Zeitschrift fur Anorganische und Allgemeine Chemie, Band 248, pp. 172-174 (1941).
Moser, "Die Darstellung von Seleniden aus Selenwasserstuff und Metallsalzlosungen", Monatsh, 235-250 (1925).
Brokl, "Die Darstellung von Metalltelluriden aus Telluriwasserstuff und Metallsalzlosurgun", Montash, 471-484 (1925).
Chemical Abstracts, vol. 76, p. 310, 189306.
Chemical Abstracts, vol. 79, p. 548, 60976p.
Chemical Abstracts, vol. 80, p. 383, 142455y.
Chemical Abstracts, vol. 85, p. 664, 152239c.
Mellor, "A Comprehensive Treatise on Inorganic and Theoretical Chemistry", Longmans, Green & Co., N.Y., vol IX, pp. 814-818.
Tibbals, "A Study in Tellurides", General, Physical and Inorganic Chemistry, 1909, pp. 902-913.
Taimni et al., "Application of Selenium Salts in Organic Analysis", Analytica Chimica Acta, vol. 25, 1961, pp. 438-447.
Chemical Abstracts, vol. 28, p. 2633(4).
Veller, "Formation of Chromium (III) Sulfide", Ukrains' kyi Chem. Zhur II, Weis Teil 22-27 (1936).

Habashi, "Extractive Metallurgy", vol. 2, Hydrometallurgy Science Publishers, Paris p. 216.
Lutz et al., "Preparation of Chromium Sulfide from Organic Solvents", Z. Naturforsch, Teil B (1974) 29(5-6) pp. 385-388.
Mellor, "A Comprehensive Treatise on Inorganic and Theoretical Chemistry", Longmans, Green and Co., N.Y., vol. VII, pp. 90 and 91.

*Primary Examiner*—Earl C. Thomas
*Attorney, Agent, or Firm*—Joseph J. Allocca

[57] ABSTRACT

A method is described for the preparation of chalcogenides of ruthenium, rhodium, osmium and iridium transition metals of the Periodic Table of the Elements which comprises mixing in the absence of an aqueous solvent a Group VIII transition metal salt with a source of chalcogenide, said chalcogenide being selected from the group consisting of sulfur, selenium, tellurium and mixtures thereof, yielding a precipitate of the formula $MX_y$ wherein M is selected from the group consisting of ruthenium, rhodium, osmium and iridium, X is sulfur, selenium, tellurium and mixtures thereof and y is a number ranging from about 0.1 to about 3, preferably 0.1 to about 2.5. By the practice of the nonaqueous synthesis technique, Group VIII chalcogenides are prepared which are finely divided, have a high surface area, small particle size and small crystallite size which are also free of excess sulfur, water and/or hydrolysis products. Layered stoichiometric osmium disulfide is prepared by this technique. The precipitates may be cleansed of any anion salt coproduct by any technique common to the art.

Compounds of the formula $MX_y$ thus prepared are superior sulfur-tolerant catalysts in catalytic processes, for example, hydrodesulfurization, hydrodenitrogenation, hydroconversion, hydrogenation.

15 Claims, No Drawings

METHOD OF PREPARING CHALCOGENIDES OF GROUP VIII BY LOW TEMPERATURE PRECIPITATION FROM MONAQUEOUS SOLUTION, THE PRODUCTS PRODUCED BY SAID METHOD AND THEIR USE AS CATALYSTS

This is a continuation, of application Ser. No. 014,589, filed Feb. 23, 1979, now abandoned, which is a continuation under 37 CFR 1.60 of Ser. No. 797,011 filed May 16, 1977, now abandoned.

FIELD OF THE INVENTION

A method is disclosed for the preparation of chalcogenides of the formula $MX_y$ wherein M is selected from the group consisting of ruthenium, osmium, rhodium, iridium; preferably ruthenium, rhodium and iridium, most preferably ruthenium, X is selected from the group consisting of sulfur, selenium, tellurium and mixtures thereof, preferably sulfur, and selenium, most preferably sulfur; and y is a number ranging from about 0.1 to about 3, which method comprises preparing a near or nonaqueous reactive solution or slurry wherein is added (i) a ruthenium, osmium, rhodium or iridium, salt, the anion of the salt, preferably selected from the group consisting of halide (preferably chloride), acetate, carboxylate, nitrate and sulfate, and (ii) a source of sulfide, hydrosulfide ($HS^-$), selenide, telluride ions, and mixtures thereof, preferably sulfur and selenium, most preferably sulfur, said source being selected from the group consisting of $K_2X$, KHX, $Li_2X$, NaHX, $NH_4HX$, $(NH_4)_2X$, $Na_2X$, $(RNH_3)_2X$, LiHX, $(R,R'NH_2)_2X$, $(R,R'R''NH)_2X$ wherein R, R' and R'' are the same or different $C_1$-$C_{20}$ alkyl, $C_6$-$C_{20}$ aryl, preferably $C_1$-$C_8$ alkyl, $C_6$-$C_{12}$ aryl and X is a chalcogenide selected from sulfur, selenium, tellurium, and mixtures thereof, preferably sulfur and selenium, most preferably sulfur. The reaction may be run neat, that is, in the absence of any added solvent. Alternatively, a nonaqueous solvent may be utilized, and, if used at all, is selected from the group consisting of ethers having 4-8 carbons, acetonitrile, benzonitrile, pyridine, propinitrile, N-methylformamide, dimethylformamide (DMF), 1,2-dimethoxyethane (DME), propylene carbonate, ammonia, aromatics of 6-20 carbons, preferably $C_6$-$C_{12}$, molten sulfur, sulfur dioxide, diglyme, ethylacetate, esters of from $C_4$ to $C_5$, sulfolane, dimethylsulfite, tributylphosphate, $C_1$-$C_{30}$ amines, preferably $C_1$-$C_{20}$, $C_5$-$C_{12}$ alkanes, preferably $C_6$-$C_8$, anhydrous acids such as formic, and glacial acetic, alkyl halides of from 1 to 20 carbon atoms, aryl halides of from $C_6$-$C_{20}$ wherein the halide is selected from the group consisting of Cl, Br and I and typical hydrocarbon feedstreams. Tetrahydrofuran (THF), ethylacetate, dimethylformamide (DMF), chlorobenzene, chloroform, pyridine, propylene carbonate and acetone may be used as solvents of choice.

The reaction proceeds spontaneously upon mixing at low temperatures, temperatures below 400° C., and at atmospheric pressure. The products may be isolated by filtration and washing using excess solvent (when a solvent is used) or by pumping off the coproduced anion salt if it is volatile. The products obtained by the above method are ruthenium, rhodium, osmium and iridium chalcogenides and stoichiometric chalcogenides. Osmium disulfide produced by the above method possesses a layered structure having lattice parameters a=3.52 and c=6.15 and a surface area of about 50 $m^2$/gm.

Compounds of the formula $Mx_y$ wherein M, X and y are as defined above, prepared by the low temperature, non-aqueous precipitation technique described herein are superior catalysts for the treatment of hydrocarbons, being especially useful as HDS catalysts, HDN catalysts, hydroconversion catalysts and hydrogenation catalysts.

PRIOR ART

U.S. Pat. No. 3,291,720 to Dobres et al describes a process for hydrorefining and hydrocracking hydrocarbons with a supported rhodium sulfide catalyst. The patent is proportedly based on the fact that rhodium sulfides exist with rhodium-to-sulfur ratios of 1:1, 1:0.75, 1:0.67 and 1:0.4. The rhodium catalyst is prepared by impregnating a base with a rhodium solution such as rhodium chloride and then converted to the sulfide in situ. The catalyst is converted to rhodium sulfide in situ by contacting the supported rhodium metal with a hydrocarbon feedstream containing organic sulfur which sulfur can be converted into $H_2S$. By so doing, an $H_2S$ atmosphere is generated over the rhodium and in this manner the rhodium sulfide is prepared.

F. M. Jaeger and J. H. deBoer Proc. Acad. Sci. Amsterdam 23 95-102 (1920) reveal that at lower temperatures (i.e. ~0° C.) quadrivalent Ru salts and $(NH_4)_2S$ give a greenish-black ppt which is soluble in an excess of the precipitating agent. The greenish solution exhibits colloidal properties (it shows the Tyndall effect), the dispersed particles carrying a negative charge. The colloidal suspension is described as being unstable, susceptible to rapid flocculation when put in contact with air. The solution appears more stable when first strongly diluted with water but even under these circumstances, complete flocculation occurs within 24 hours. The authors draw the conclusion that the sulfide precipitated from ruthenium solutions by ammonium sulfide between 0° C. and boiling temperature are really mixtures of stable $RuS_2$ and the unstable greenish-black sulfide here described (the greenish-black Ru sulfide being one readily oxidizable). It must be noted that the method of preparation involved in the article appears to be an aqueous technique.

Lutz et al, Z. Naturforsch, Teil B, 1971, 26 (11), 1096-7 (Ger) describe the preparation of heavy metal sulfides by precipitation from organic solvents. $In_2S_7$, CoS, NiS, CuS, ZnS, CdS, HgS, PbS, $Ag_2S$ and a number of thiospinels were precipitated from solutions of the metal naphthenate in $C_6H_6$, THF, or naphthalene by $H_2S$.

Numerous examples exist in the art of the use of metal sulfides as hydrodesulfurization catalysts. Vol-Epshtein et al Soviet No. 323,431 describes the desulfurization of naphthalene and naphthalene containing fractions by hydrogenation under a pressure of hydrogen at elevated temperature using a catalyst consisting of palladium sulfide on a carrier. The catalyst preferably contains 0.3 to 5% Pd. The process is carried out at 230°-320° C.

Dovell in U.S. Pat. No. 3,538,161 describes the preparation of the selenides and tellurides of Ru, Rh, Pd, Os, Ir and Pt and their use as catalysts in a number of organic reductions. The selenides were prepared by passing $H_2Se$ gas through a solution of $RuCl_4$ (for example) 50 ml of concentrated HCl diluted to 700 ml by $H_2O$. Precipitation of $Ru_2Se_3$ was complete in ~1.5 hrs. In like manner were prepared the selenides of Rh, Pd, Os, Ir and Pt and the tellurides of Ru, Rh, Pd, Os and Pt. Diphenyl disulfide was converted to thiophenol by the action of Rh telluride. Thus, no C—C bonds are broken and the process has not resulted in hydrodesulfurization. Schwartz in U.S. Pat. No. 2,448,740 describes stable colloidal solutions of sulfur and metal sulfides. Colloidal solutions of As, Se, Mo, Sb, Sn, Ti, Pt and Au sulfides may be formed, for example, by dissolving one part of powdered As in five parts of 30% $NH_4HS$ at room temperature. To one part of the resulting sulfoarsenate, one part $NH_4$ resinoleate and one part $H_2O$ are added. The mixture is decomposed with formalin or phorone until all the $NH_3$ is combined with the aldehyde or ketone.

The stoichiometric ruthenium, rhodium, iridium and osmium chalcogenides, prepared by the nonaqueous precipitation technique of the instant process are finely divided small composite particles or completely non-crystalline. They possess crystallite sizes of about 50 Å×100 Å or less, and particle sizes of 0.1 micron (1000 Å) or less, preferably less than 0.05 micron (500 Å), that is, particulate material which is amorphous to X-ray diffraction (see "X-ray Diffraction by Polycrystalline Materials", Ed. H. S. Stokes, H. P. Rooksby and A. J. C. Wilson, Chapter 17, A. R. Stokes, pg. 409, 1955, Publ, J. Wright, London).

Particles of 0.05 micron (500 Å) or less exhibit blurred X-ray patterns or no X-ray pattern at all (amorphous). Crystallite sizes of 50 Å×100 Å are determined by use of a scanning electron microscope (SEM).

SUMMARY OF THE INVENTION

Finely-divided, high-surface area, small particle (0.1 micron [1000 Å] or less, preferably less than 0.05 micron) small crystallite (about 50 Å×100 Å or less), ruthenium, rhodium, iridium and osmium chalcogenides are described. The chalcogenide is selected from the group consisting of sulfur, selenium, tellurium and mixtures thereof, preferably sulfur and selenium, most preferably, sulfur. These chalcogenides are prepared by the two-temperature nonaqueous precipitation of said material from solutions comprising mixtures of the salts of the metals, typical anions of the salts being halide (preferably chloride), acetate, carboxylate, perfluorocarboxylate, acetylacetonate, hexafluoroacetonate, sulfate and nitrate with solutions of or slurries of sources of sulfide, selenide, telluride ions and mixtures thereof. The products of the low-temperature nonaqueous precipitation technique are distinguished from materials prepared by high-temperature (greater than 400° C.) methods of the prior art by exhibiting markedly different surface areas, particle sizes and crystallinity characteristics.

A method is also described for the synthesis of chalcogenides of ruthenium, rhodium, iridium and osmium which comprises preparing a nonaqueous reactive solution or slurry wherein is added (i) a metal salt, the salt anion being selected from the group consisting of halide, acetate, carboxylate, perfluorocarboxylate, acetylacetonate, hexafluoroacetylacetonate and (ii) a source of sulfide, selenide, telluride ions and mixtures thereof, preferably sulfide and selenide, most preferably sulfide, said sources conveniently being $Li_2X$, hydrosulfide salts (i.e. NaHX, $NH_4HX$, $(NH_4)_2X$, $Na_2X$, $K_2X$, $(RNH_3)_2X$, $(R,R'NH_2)_2X$, $(R,R',R''NH)_2X$ wherein R, R', R'' are the same or different and are selected from the group consisting of $C_1$–$C_{20}$ alkyl, preferably $C_1$ to $C_8$ or $C_6$–$C_{20}$ aryl, preferably $C_6$ to $C_{12}$, and X is the chalcogenide selected from the group consisting of sulfur, selenium, tellurium and mixtures thereof, preferably sulfur and selenium, most preferably sulfur, and a nonaqueous solvent selected from the group consisting of ethers of from $C_4$ to $C_8$, acetonitrile, benzonitrile, dimethylformamide (DMF), propylene carbonate, aromatics of $C_6$–$C_{20}$ carbons, preferably $C_6$ to $C_{12}$ ammonia, molten sulfur, diglyme, sulfur dioxide, ethylacetate, esters of from $C_4$ to $C_8$, sulfolane, tributylphosphate, anhydrous acids, such as formic acid, glacial acetic acid, alkylhalides of from $C_1$ to $C_{20}$, preferably $C_1$ to $C_5$ and arylhalides of from $C_6$ to $C_{20}$, preferably $C_6$ to $C_{10}$ pyridine, propionitrile, N-methylformamide, dimethylsulfite, $C_1$–$C_{30}$ amines, preferably $C_1$ to $C_{20}$, $C_5$–$C_{12}$ alkanes, preferably $C_5$→$C_8$. The solvents of choice are tetrahydrofuran (THF), dimethylformamide (DMF), chlorobenzene, chloroform, pyridine, ethyl acetate and acetone. The metal is preferably iridium, rhodium, or ruthenium, most preferably ruthenium. Alternatively, the reaction may be run neat, that is, in the absence of any solvent. The reaction proceeds spontaneously upon mixing at low temperature, preferably less than 400° C. but greater than −78° C., and at atmospheric pressure. The products may be isolated by filtering, washing with excess solvents or by pumping off the anion salts if they are volatile. In situations wherein the sulfide, selenide and/or telluride ion sources are already solutions, no additional solvent is needed during the course of the reaction although a volume of nonaqueous solvent (i.e. one which does not offer or accept protons) may be added so as to facilitate product isolation. When desired, the material so obtained can be pretreated, for example, in an $H_2S/H_2$ atmosphere, temperature of pretreatment being 300°–600° C., preferably 350°–500° C., the $H_2S/H_2$ atmosphere being 1% $H_2S$→100% $H_2S$, the balance being $H_2$, preferably 3%→20% $H_2S$, the balance being $H_2$. Alternatively, the material can be pretreated in situ in the catalytic reactor, the sulfur containing hydrocarbon feed stream alone being sufficient to effect the desired change. The materials obtained by the process of the instant invention, whether pretreated or not, are superior catalysts in processes such as HDS, HDN, hydrogenation and hydroconversion. Typically, the catalytic processes will be run at temperatures ranging from ambient to 500° C., preferably 100°–450° C., most preferably 200°–400° C., at pressures of from 1 atm–5000 psig of $H_2$, preferably 100–2000 psig of $H_2$ and at space velocities of from 0.1–10 V/V/hr., preferably 0.1–5 V/V/hr. When the compound is to be used as a catalyst, it may be prepared in the catalytic reaction vessel by introducing the appropriate starting material (from those recited above) into the vessel, using the hydrocarbon feed stream to be catalytically treated as the nonaqueous solvent.

When using a Group VIII chalcogenide of the type described above in the supported state the metal chalcogenide will be present at from 0.01→30 wt. % metal based on total catalyst, preferably 0.1 to 10 wt. % metal based on total catalyst.

The instant invention also relates to the low-temperature (−78° C. to 400° C.) precipitation either neat or from nonaqueous solution of finely divided high-surface area small-particle (0.01 micron or less), small-crystallite (50 Å×100 Å or less) stoichiometric Group VIII dichalcogenides and more generally, to a method for the preparation of Group VIII di- and polychalcogenides, in particular, the sulfides and most particularly, the disulfides.

Typically, a metal salt such as $RuCl_4$ is reacted with a solution of, or a slurry of a convenient sulfide, selenide or telluride ion source such as $Li_2S$, $Na_2S$, $K_2S$ hydrosulfide salt (i.e. $NH_4HS$, NaHS), $(NH_4)_2S$, $Na_2S$, $(RNH_3)_2S$, $(R,R'NH_2)_2S$, $(R,R', R''NH)_2S$, wherein R, R' and R'' are the same or different $C_1-C_{20}$ alkyl or $C_6-C_{20}$ aryl, preferably $C_1$ to $C_8$ alkyl or $C_6-C_{12}$ aryl, $Li_2Se$, $Li_2Te$, $(NH_4)_2Se$ in a nonaqueous solvent such as THF, other organoethers, acetonitrile, propylene carbonate, DMF, molten sulfur, etc. The reaction which occurs may be represented by the following equation (which represents the reaction when M is a +4 metal ion):

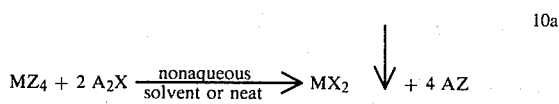

$$MZ_4 + 2 A_2X \xrightarrow[\text{solvent or neat}]{\text{nonaqueous}} MX_2 \downarrow + 4 AZ$$

where
M = a Group VIII metal,
A = alkali metal$^\oplus$, $NH_4^+$, R, R'R''NH$^\oplus$, R, R'NH$_2^\oplus$ or other action as defined above,
Z = convenient anion such as Cl$^\ominus$, Bi$^\ominus$, I$^\ominus$, acetate$^\ominus$, carboxylate$^\ominus$, nitrate$^\ominus$, sulfate$^\ominus$ etc. as recited above,
X = sulfur, selenium or tellurium.

Any convenient source of $M^{\oplus 2} \rightarrow M^{\oplus 5}$, preferably $M^{\oplus 3}$ and $M^{\oplus 4}$ can be used. Complexes formed in solution which can be isolated as solids may be used as $M^{\oplus 4}$ sources.

The ruthenium, rhodium, iridium and osmium salts are desirably, although not necessarily, soluble in organic solvents such as THF since it is possible to conduct the reaction neat in most cases. Therefore, solution concentrations are not critical. Anions, which are envisioned as generating the metal salt, are selected from the group consisting of halides, selected from the group consisting of fluorine, chlorine, bromine and iodine, acetates, carboxylates, perfluorocarboxylates, amines, acetylacetonates, hexafluoroacetylacetonates, nitrates and sulfates, wherein in all cases, the carbonaceous moiety of the anion is a $C_1$ to $C_8$ hydrocarbon or fluorocarbon, preferably a $C_1$ to $C_3$ hydrocarbon or fluorocarbon.

Typical nonaqueous solvents which may be used when neat reactions are undesired are acetonitrile, benzonitrile, propionitrile, alkyl halides of from 1 to 20 carbon atoms, arylhalides of from $C_6$ to $C_{20}$ carbon atoms, 1,2, dimethoxyethane, diglyme, N-methylformamide, dimethylformamide, ethers of from $C_4$ to $C_8$, ammonia, molten sulfur, sulfur dioxide, ethylacetate, esters of from $C_4-C_8$, aromatics of $C_6-C_{20}$ carbons, preferably $C_6$ to $C_{12}$, most preferably benzene, pyridine, sulfolane, tributylphosphate, anhdyrous acids such as formic acid, glacial acetic acid, propylene carbonate, tributylphosphate, dimethylsulfite, $C_1-C_{30}$ amines, preferably $C_1-C_{20}$, $C_5$ to $C_{12}$ alkanes, preferably $C_5-C_8$, such as hexane. The alkylhalides are preferably of from $C_1$ to $C_5$ in size and the arylhalides are from $C_6$ to $C_{10}$ in size. Alternatively, the nonaqueous solvent can be the hydrocarbon feedstream which is to be catalytically treated by the $MX_y$ composition.

The reaction is normally but not necessarily, conducted in the absence of an excess of sulfide, selenide or telluride, although other starting materials may be present in excess. Since particle size depends on the rate of mixing of reagents, the reaction may be allowed to proceed instantly, upon total admixture of one reagent to the reaction solution yielding fine products or, upon the measured addition of small increments of one reagent to the reaction solution, the reaction not achieving totality for several days. After precipitation the resulting product may be treated in an $H_2/H_2S$ atmosphere for several hours. Such treatment however, is not critical for the practice of the instant invention, it just being an available option. The materials prepared by the instant process, whether sulfided or not are useful in catalyst reactions, in particular hydrosulfurization, hydrodenitrogenation, hydroconversion and hydrogenation.

As previously stated, the reagents may be mixed neat, i.e., no added solvent, when this is feasible, or may be diluted with solvent. The use of solvent, therefore, is not critical to the reaction; however, when a solvent is utilized, it must be nonaqueous.

The temperature of the reaction may range from $-78°$ C.$-400°$ C., preferably ambient (25° C.) to 300° C. It must be noted that any convenient temperatures below 400° C. may be used, the only requirement being that the low temperature chosen be above the freezing point of the nonaqueous solution used or slurry formed. These temperatures are markedly lower than those needed when preparing dichalcogenides via solid state or gas phase methods wherein reaction temperatures up to and exceeding 1000° C. are commonplace.

The products obtained from the low temperature nonaqueous precipitation technique are di- and polychalcogenide, particularly dichalcogenides and more particularly, disulfides, and have unique properties. The products may also be stoichiometric in character. The particle size and crystallinity of these materials can be greatly varied by practicing the preparative methods of the instant invention. Small single crystals or high-surface area powders which are amorphous to X-ray (i.e. given no X-ray pattern) can be obtained. Lack of X-ray pattern indicates a crystallite size of less than 0.05 micron (500 Å) or a completely amorphous solid. Surface areas can be raised to the point where the dichalcogenide will remain suspended in solution and homogeneous dispersions created. This effect can be increased by using more polar nonaqueous solvents such as DMF or basic solvents such as pyridine or propylene carbonate which have a natural tendency to attach to the sulfur layers and cause dispersions. These same solvents are those which tend to intercalate in crystalline transition metal dichalcogenides. See Gamble et al, U.S. Pat. No. 3,766,064 for a list of such intercalation materials. Such dispersions can be gelled by proper variation of conditions or adsorbed on basic substrates such as CaO. The materials prepared by the process of the instant invention have utility as electrodes, catalysts, and are useful in the preparation of intercalation compounds which are then useful as lubricants and superconductors.

PARTICLE SIZE AND CRYSTALLINITY

The above-mentioned preparation allows one to choose between a wide range of particle size, crystallinity and surface area compounds. Solids may be prepared which have the following properties:

A. High-surface area, small-particle size and amorphous structure. Such characteristics are achieved by use of a solvent which may have the ability to form intercalation complexes with the chalcogenide. Alternatively, chalcogenides formed neat or in the absence of an intercalation solvent may be treated with an intercalate to achieve the same result. Such intercalates may be a strong Lewis base such as pyridine, ammonia, $C_1-C_{20}$ amines, aldehydes, ketones, amides, heterocyclic bases, anilines and ethers. The intercalated chalcogenide is then subjected to heat treating at between 75°–200° C. with pumping under vacuum when necessary to drive off the intercalating solvent leaving a high-surface area, small-particle size amorphous chalcogenide. Example: $RuS_2$ prepared from ethylacetate and treated at 400° C. in $H_2S$ gave a poorly-defined X-ray pattern which indicates a crystallite size of at least less than 0.1 micron and a Brunauer, Emmett and Teller (BET) surface area of 50 $m^2/gm$. Treatment temperature less than 400° C. yields high-surface areas or completely amorphous solids.

B. Low surface area, small-particle size and amorphous solids. Example: The same $RuS_2$ as mentioned in (A) if not heat treated gave an amorphous X-ray pattern and a BET surface area of 10 $m^2/gm$.

C. Homogeneous dispersions: conditions can be arranged as above so that all or part of the chalcogenides remain in suspension as a homogeneous dispersion in solution. Appropriate solvents which are used for the generation of dispersions of Group VIII chalcogenides include propylene carbonate, dimethylformamide (DMF), pyridine, acetonitrile, benzonitrile, propionitrile, 1,2 di-methoxyethane, diglyme, n-methylformamide. If propylene carbonate (PC) is used as solvent, the supernatant phase will be a dark opaque dispersion which is unchanged on filtration and which does not settle out over a period of weeks or months. Alternatively if in addition to a nondispersing solvent (such as THF) a dispersing agent such as pyridine (or alkylamine) is initially present a similar dispersion will result. Such materials can be removed from solution by the addition of a basic solid such as MgO. For example, $RuS_2$ prepared in propylene carbonate will result in a black opaque dispersion of $RuS_2$. The $RuS_2$ may be absorbed by shaking the dispersion with MgO which results in a dark gray material when dried. Correspondingly, the original solution is clear after such treatment with the excess MgO.

D. High-surface area composite—Group VIII dichalcogenide metal oxide solids. Composite materials may be prepared with the ruthenium, rhodium, iridium and osmium chalcogenide being absorbed on a metal oxide due to the Lewis acid nature of the chalcogenide. Example $RuS_2/MgO$ material described in (C) above. The metal oxides which may be used in this embodiment are any metal oxides which exhibit Lewis acidity, for example, MgO, CaO, $Al_2O_3$, the oxides of Groups IV, V and VI of the Periodic Table of the Elements, preferably $TiO_2$, $ZrO_2$, alternatively, even activated carbon or charcoal may be used.

E. Gels and Glasses—Gels containing the Group VIII dichalcogenides may be produced by preparation in certain amines, such as trihexylamine or by carefully removing solvent from ethylacetate solutions of $RuCl_4 + 2Li_2S$. The gels produced yield glasses when the solvents are removed.

EXPERIMENTAL

All of the preparative work described was carried out either in a dry box or under a blanket of nitrogen. Both the starting metal +4 and +5 compounds and the sulfides and selenides thus produced are sensitive to moisture and oxygen, especially in finely-powdered form as results from the heterogeneous precipitation methods described. All solvents were dried by standard techniques prior to use, and anhydrous reagents were always employed.

EXAMPLES OF PREP. AND PHYSICAL CHARACTERISTICS OF RUTHENIUM RHODIUM, IRIDIUM AND OSMIUM CHALCOGENIDES RUTHENIUM (1) $RuS_2$ was generally prepared from the tetrachloride but preparation from the trichloride is also possible. There were significant differences in the activity and selectivity between the two preparations:

$$RuCl_4 + 2Li_2S \rightarrow RuS_2 + 4LiCl$$

7.40 gm of $RuCl_4$ (30.47 mm) was dissolved in 100 ml of ethyl acetate and 2.80 gm $Li_2S$ (60.94 mm) was added in the dry state. This was allowed to stir for 4 hours and filtered, yielding a black powder which was still wet with ethylacetate. The filtrate was partially green indicating suspended particles of $RuS_2$. The sample was then heat treated in pure $H_2S$ at 400° C. for 1.5 hours, cooled to room temperature, washed with 12% acetic acid, filtered and heated again in pure $H_2S$ for 1.5 hours. This treatment yielded a black powder weighing 6.683 gms (theoretical yield of $RuS_2 = 5.11$ gms) which showed only $RuS_2$ in the X-ray pattern. Chemical analysis showed 3.89 moles of sulfur for each ruthenium atom with less than ½% chlorine. Infrared also indicated the presence of an extra phase. This extra phase appears to be atomic sulfur caused by the catalytic decomposition of $H_2S \rightleftharpoons H_2 + S°$ and we may note that $RuS_2$ has been claimed as a catalyst for producing $H_2$ from $H_2S$ above the boiling point of sulfur.

This was further confirmed by treatment of the $RuS_2$ as produced above with mixtures of $H_2/H_2S$ providing lower partial pressures of sulfur. For example, $RuS_2$ after being run in the flow reactor for more than 1000 hours showed only $RuS_2$ in the X-ray pattern and gave the following chemical analysis:

| | Theoretical $RuS_2$ | Measured | Theoretical $RuS_{1.75}C_{0.25}$ |
|---|---|---|---|
| Ru | 61.2% | 62.4% | 63.1% |
| S | 38.8% | 34.6% | 35.0% |
| C | 0.0% | 2.1% | 1.9% |
| Total | 100.0% | 99.1% | 100.0% |

All results indicate that $RuS_2$ itself has a range of possible non-stoichiometry and the above example corresponds to the formula $RuS_{1.75}$. We may note that if we assume that the carbon found in the analysis is substituted for the missing sulfur giving a stoichiometry of $RuS_{1.75}C_{0.25}$ we get good agreement with the chemical analysis. This further suggests as indicated in the next section that this carbon is replacing the sulfur on the surface of the catalytically active particles. The infrared spectrum of $RuS_2$ which has been treated to remove excess sulfur is very similar to that of $FeS_2$. These compounds freshly prepared had BET surface areas in the neighborhood of 70 $M^2/gm$.

$$\text{(a) } 2RuCl_3 + 3Li_2S \xrightarrow{\text{ethyl acetate}} Ru_2S_3 + 6LiCl \quad (2)$$

$$\text{(b) } Ru_2S_3 + H_2S \xrightarrow{400° C.} 2RuS_2 + H_2$$

The trichloride preparation is exactly analogous to the above tetrachloride preparation yielding RuS₂. The catalytic activity of the two preparations are slightly different as discussed in a previous section. This is undoubtedly due to a difference in the physical state of the RuS₂.

OSMIUM

OsS₂ was prepared from the tetrachloride:

$$OsCl_4 + 2Li_2S \rightarrow OsS_2 + 4LiCl$$

4 grams of OsCl₄ was added to 100 ml of ethyl acetate yielding a greenish solution. 1.12 gm of Li₂S was added as the solid and the solution turned black with stirring. The solution was filtered and a black powder was obtained which was treated at 400° C. in a stream of H₂/15% H₂S for 2 hours. The solid was then washed with 12% acetic acid and treated again for 2 hours at 400° C. in H₂/15% H₂S. The resulting black powder weighed 2.80 gms (theoretical=3.10 gms) with a BET surface area of 20 m²/gm. X-ray analysis as discussed below indicated that the OsS₂ was a previously unknown layered compound which could be converted to the known pyrite type by heating in vacuum at 600° C. The osmium sulfide prepared by this method was converted to Os metal under reactor conditions. However, the chemical analysis indicated that the stoichiometry was OsS. In H₂/15% H₂S the OsS₂ had partially converted to the metal after several hours.

IRIDIUM

IrS₂ was prepared from the tetrachloride:

$$IrCl_4 + 2Li_2S \rightarrow IrS_2 + 4LiCl$$

2.00 gms of IrCl₄ was dissolved in 175 ml of ethyl acetate. The solution became dark brown. To this 0.55 gms of Li₂S was added neat with the color changing from a dark brown to golden. After stirring for 3.5 hours a golden powder was recovered. 1.8 gms of the product was heat treated in 15% H₂S/N₂ for 2 hours, washed in 12% acetic acid then reheated in 15% H₂S/N₂ for 2 hours yielding a black powder with a BET surface area of 60 M²/gm. The acetic acid wash caused bubbling and fizzing which indicates incomplete reaction of Li₂S. As in the case of RuS₂ prepared in H₂S the product contained excess sulfur. X-ray powder diffraction yielded a very diffuse pattern probably of pyrite type IrS₃. However, this compound reverted in the reactor to Ir metal+S°.

RHODIUM

Rh₂S₃ was prepared in the same manner as the previous examples from the trichloride:

$$2RhCl_3 + 3Li_2S \rightarrow Rh_2S_3 + 6LiCl$$

X-ray analysis before and after reaction indicated the presence of Rh₂S₃ which had a BET surface area of 15 M²/gm.

PLATINUM AND PALLADIUM

Both platinum and palladium were fairly inactive in the model reaction and thus their activities were not greatly affected by method of preparation. Thus, for this group commercially, PdS and PtS are the stable species in the reactor. PdS was prepared from the dichloride in a similar manner to the compounds previously described:

$$PdCl_2 + Li_2S \rightarrow PdS + 2LiCl$$

PtS was prepared in this manner but was also prepared from the tetrachloride. This reaction led to chemical results differing from previous examples:

(a) $PtCl_4 + 2Li_2S \xrightarrow{\text{ethyl acetate}} PtS_2 + 4LiCl$ (b) $PtS_2 \xrightarrow[H_2S]{400° C.} PtS$ 1.0 gms of PtCl₄ was dissolved in 200 ml of ethyl acetate and then divided into two samples. 100 ml was allowed to stand. Upon standing the solution began to darken and precipitation began to occur. A golden film began to form as well as crystals. The crystals when examined under polarized light were highly pleochroic transmitting light perpendicular but not parallel to their long axis indicating the formation of a Pt chain complex. Preliminary chemical analysis indicates a PtCl₄:LiCl::ethyl acetate complex.

Treatment of the remaining portion of the solution with Li₂S as in previous examples yielded PtS after heat treating.

TABLE I
PARTICLE SIZE ANALYSIS OF CATALYSTS*
(Catalysts are used unless otherwise noted)

| Catalyst | Structure | hkl | B° | Particle Size A | BET M²/gm |
|---|---|---|---|---|---|
| OsS₂ (Fresh) | Layered | 002 | 3.3 | 29 | 20 |
| | | 110 | 2.1 | 51 | |
| Os° + S | Metal | 101 | 2.9 | 35 | 15 |
| RuS₂ | Pyrite | 200 | 1.2 | 90 | 52 |
| Rh₂S₃ | Rh₂S₃ | 200 | 0.6 | 162 | 15 |
| IrS₂₊ₓ(Fresh) | Pyrite | 200? | 7.0 | 14 | 73 |
| Ir° + S | Metal | 111 | 1.2 | 82 | 15 |
| PdS | PdS | 200 | 0.3 | 324 | — |
| PtS | Cooperite | 110 | 0.5 | 202 | 11 |

*Particle Sizes where calculated using:

$$D = \frac{K\lambda}{\beta \cos\Theta}$$

K = 1.05 for most spherical and cubic particles. For layered materials this may be in error for in plane vectors
λ = 1.5418 A
β = line width at half height in radians. A correction was not made for instrumental line broadening which is a serious error only for larger particles such as PdS.

Ruthenium, rhodium, iridium and osmium transition metal chalcogenides, preferably sulfides, prepared in high surface area described herein are excellent hydrodesulfurization, sulfur tolerant, hydrogenation and hydrodenitrogenation catalysts under typical conditions found in hydrofining process of petroleum and coal based feedstocks. The Ru, Rh, Ir and Os sulfides are also effective as hydrogen-donor catalysts, i.e. they will abstract hydrogen from hydrogen-donor solvents like decalin, tetralin, etc. and use the abstracted hydrogen in the hydrodesulfurization process. As hydrodesulfurization and Sulfur Tolerant Hydrogenation Catalysts A. The Ru, Rh, Ir and Os binary chalcogenides, preferably sulfides effectively desulfurize dibenzothiophene at elevated temperatures and pressures according to the following reaction:

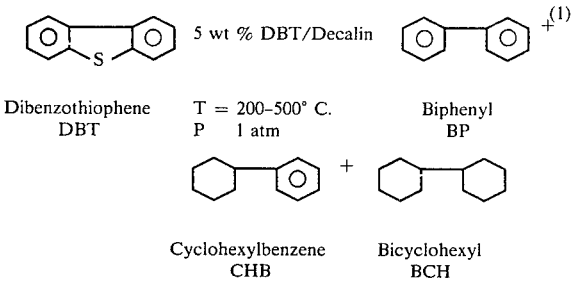

Dibenzothiophene   T = 200-500° C.   Biphenyl
DBT                P   1 atm         BP Cyclohexylbenzene   Bicyclohexyl
CHB                 BCH The amount of cyclohexylbenzene and bicyclohexyl formed serve as a measure and indication of the hydrogenation capabilities of these materials in sulfur environments. Tables II and III summarize the hydrodesulfurized and hydrogenation activity of the Group VIII metal sulfides.

TABLE II

HYDRODESULFURIZATION ACTIVITY OF GROUP VIII TRANSITION METAL SULFIDES

Conditions: Carberry Reactor, 400° C., 450 psi,
10/20 mesh catalyst particles

| Catalyst | Activity = $r \times 10^{16}$ BP | molecules DBT→x BP and CHB gm - Sec CHB |
|---|---|---|
| $FeS_{2-x}$ | 0.9 | — |
| $Co_9S_8$ | 1.6 | — |
| NiS | 1.6 | — |
| $RuS_2 \rightarrow RuS_{2-x}$ | 210 | 20 |
| $RhS_{1.5} \rightarrow RhS_{1.5-x}$ | 70 | — |
| PdS | 9 | — |
| $OsS_2 \rightarrow OsS_{2-x}$ | 85 | — |
| $IrS_2 \rightarrow IrS_{2-x}$ | 67 | — |
| PtS→ | 7 | — |

TABLE III

HYDRODESULFURIZATION AND HYDROGENATION ACTIVITY OF GROUP VIII TRANSITION METAL SULFIDES

Conditions: Carbrey Reactor, 350° C., 450 psi,
20/40 mesh particles

| Catalyst | Activity = $r \times 10^{16}$ x = BP | molecules DBT→x BP and CHB gm - sec CHB |
|---|---|---|
| $RuS_2 \rightarrow RuS_{2-x}$ | 113 | 24 |
| $RhS_{1.5} \rightarrow RhS_{1.5-x}$ | 49 | 10 |
| $OsS_2 \rightarrow OsS_{2-x}$ | 40 | 17 |
| $IrS_2 \rightarrow IrS_{2-x}$ | 21 | 17 |
| PtS→ | 4 | 0.4 |

These bulk sulfides will maintain their hydrodesulfurization activity and hydrogenation activity for extended periods of time in a flow reactor configuration under wide ranges of temperatures, pressures and liquid hourly space velocities. In fact, when compared to a commercial Nalco Cobalt Molybdate, an $\gamma$-$Al_2O_3$ (JCM-468) catalyst, CMA, several materials display comparable to superior activity per gram.

It is generally envisioned that the materials herein described as $MX_y$, wherein M, X and y are as previously defined, will be used as catalysts in typical hydrocarbon treatment process such as HDS (hydrodesulfurization) HDN, (hydrodenitrogenation) hydrogenation and hydroconversion reactions. They demonstrate superior characteristics in such hydrocarbon treatment processes. These processes will typically be run at temperatures between ambient to 500° C., preferably 100°–450° C., most preferably 200°–400° C., at pressures ranging from 1 atm to 5000 psig of $H_2$, preferably 100 to 2000 psig of $H_2$ at space velocities of from 0.1→10 V/V/hr., preferably 0.1–5 V/V/hr.

Table IV summarizes the flow reactor data obtained on $RuS_2$ (bulk) and where possible compares it to the commercial CMA catalyst described above. This binary sulfide maintained its activity over an extended period of 1053 hours (—44 days).

TABLE IV

HYDRODESULFURIZATION AND HYDROGENATION ACTIVITY OF $RuS_2$ OVER A WIDE RANGE OF TEMPERATURES AND LIQUID HOURLY SPACE VELOCITIES

Conditions: Flow reactor, pressure ~450 psi, T = 210–400° C.,
$H_2$ flow 100–500 cc/min, Liquid Hourly Space Velocity = 1–8 V/V/H, 3.91 grams catalyst

| Catalyst | Temperature °C. | LHSV | Activity (mole % conversion) BP | CHB | Total BP and CHB |
|---|---|---|---|---|---|
| $RuS_2$ | 350 | 8 | 34 | 65.5 –66 | 99.5 –100 |
| CMA* | 350 | 8 | 74 | 15 | 89 |
| $RuS_2$ | 325 | 8 | 57 | 33 | 90 |
| CMA* | 325 | 8 | 51 | 10 | 61 |
| $RuS_2$ | 300 | 1 | 9 | 91 | ~100 |
| $RuS_2$ | 265 | 1 | ~60 | 40 | ~100 |

*Commercial Co/Mo/$Al_2O_3$ catalyst

The Group VIII transition metal chalcogenides, preferably sulfides, prepared via nonaqueous dispersions on supports described herein are active hydrodesulfurization, hydrogenation and hydrodenitrogenation catalysts and are often superior to prior art materials. The materials are prepared by three techniques described below:

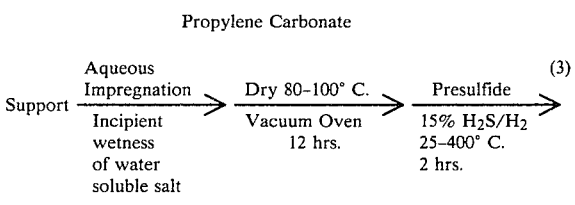

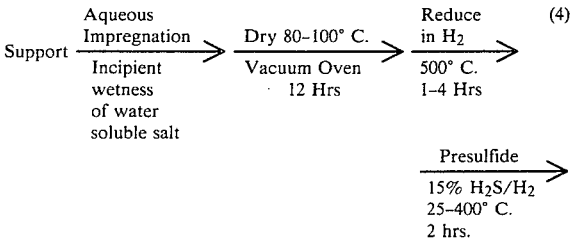

The hydrodesulfurization of supported ruthenium catalysts are compared on a per gram and per millimole Ru basis in Tables V and VI. Table V indicates that $RuS_2$ supported on MgO, Material 1, prepared by the nonaqueous dispersion displays superior activity compared to prior art Materials 2 and 3.

TABLE V
THE EFFECT OF PREPARATION ON THE HYDRODESULFURIZATION ACTIVITY OF SUPPORTED RUTHENIUM SULFIDE CATALYSTS

Conditions: Carberry Reactor, 350° C., 450 psi, 20/40 mesh particles

| Catalyst (wt. % M) | | Method of Preparation | Activity $r \times 10^{16} \frac{\text{molecules DBT} \rightarrow \text{BP}}{\text{gm - sec}}$ | Activity $r \times 10^{16} \frac{\text{molecules DBT} \rightarrow \text{BP}}{\text{millimole Ru-sec}}$ |
|---|---|---|---|---|
| (1) $RuS_2$/MgO | (0.97) | Reaction Rxn 2 | 23 | 237 |
| (2) Ru/MgO | (0.82) | Reaction Rxn 3 from $RuCl_3 \cdot 6H_2O$ | 7 | 93 |
| (3) Ru/MgO | (0.82) | Reaction Rxn 4 from $RuCl_3 \cdot 6H_2O$ | 1 | 12 |

Table VI provides additional data indicating that supported Group VIII chalcogenides prepared via nonaqueous dispersion techniques, are superior HDS catalysts compared to prior art materials, i.e. Material 2 is superior to prior art Materials 3 and 4; Material 5 is superior to prior art Material 6. In addition, Table VI demonstrates that Group VIII chalcogenides supported on a basic support such as MgO via dispersion techniques are superior to other dispersion supported materials: Material 1, $RuS_2$/MgO is a much better HDS catalyst per gram and per millimole of Ru than Materials 2, 5, or 7.

removal of organic nitrogen from petroleum, shale and coal based feedstocks.

Table VIII summarizes some typical results which reflect the HDN of these materials using a model organonitrogen compound, quinoline. The degree of nitrogen removal was followed analytically by determining the nitrogen content of the feed (ppm) before and after contact with the catalyst in a high pressure and temperature flow reactor. These materials will be effective denitrogenation catalysts over a range of temperatures, pressures and space velocities: T=250°-500° C., P hydrogen 1 atm.

TABLE VI
THE EFFECT OF PREPARATION AND SUPPORT ON THE HYDRODESULFURIZATION ACTIVITY OF SUPPORTED RUTHENIUM SULFIDE CATALYSTS

Conditions: Carbery Reactor, 400° C., 450 psi, 10/20 mesh particles

| Catalyst (wt. % M) | | Method of Preparation | Activity $r \times 10^{16} \frac{\text{molecules DBT} \rightarrow \text{BP}}{\text{gm - sec}}$ | Activity $r \times 10^{16} \frac{\text{molecules DBT} \rightarrow \text{BP}}{\text{millimole Ru-sec}}$ |
|---|---|---|---|---|
| (1) $RuS_2$/MgO | (0.97) | Rxn 2 | 30 | 313 |
| (2) $RuS_2$/$TiO_2$ | (0.96) | Rxn 2 | 11 | 116 |
| (3) Ru/$TiO_2$ | (1.94) | Rxn 3 from $RuCl_3 \cdot 6H_2O$ | 14 | 73 |
| (4) Ru/$TiO_2$ | (2.0) | Rxn 4 from $RuCl_3 \cdot 6H_2O$ | 10 | 51 |
| (5) $RuS_2$/$Al_2O_3$ | (1.81) | Rxn 2 | 9 | 50 |
| (6) Ru/$Al_2O_3$ | (2.0) | Rxn 3 from $RuCl_3 \cdot 6H_2O$ | 9 | 45 |
| (7) $RuS_2$/$ZnTiO_4$ | (0.89) | Rxn 2 | 3 | 34 |

AS HYDROGEN-DONOR CATALYSTS

The Group VIII transition metal sulfides are active as hydrogen donor catalysts; that is, they will abstract donatable hydrogen from hydrogen donor solvents like decalin, tetralin, etc. and use it in hydrodesulfurization of polynuclear aromatic sulfur compounds such as dibenzothiophene. Some typical hydrodesulfurization via hydrogen donor solvent activities are summarized in Table VII.

TABLE VII
HYDRODESULFURIZATION ACTIVITY OF GROUP VIII BINARY SULFIDES VIA HYDROGEN DONOR REACTIONS

Conditions: Carberry Reactor, 450 psi, He atmosphere. Decalin serves as hydrogen source.

| Catalyst | Temperature | Particle Size | Activity $r \times 10^{16} \frac{\text{Molecules DBT} \rightarrow \text{BP}}{\text{gm-sec}}$ |
|---|---|---|---|
| $RuS_2 \rightarrow RuS_{2-x}$ | 350 | 10/20 | 14 |
| $OsS_2 \rightarrow OsS_{2-x}$ | 400 | 20/40 | 23 |

AS HYDRODENITROGENATION CATALYSTS

The bulk and supported Group VIII transition metal chalcogenides, preferably sulfides, described herein are active hydrodenitrogenation (HDN) catalysts for the

TABLE VIII
HYDRODENITROGENATION ACTIVITY OF GROUP VIII CHALCOGENIDES

Conditions: High Pressure Flow Reactor; Feed: .8% S, .099% N in decalin (S as dibenzothiophene, N as quinoline) T = 280° C., P = 450 psi, LHSV = 1.3

| Catalyst | % N in Feed | % N in Product | % HDN |
|---|---|---|---|
| $RuS_2$ | 0.099 | 0.013 | 87% |

What is claimed is:

1. Chalcogenides amorphous to x-ray, having a particle size of less than 0.1 micron and a crystallite size of about 50 Å × 100 Å or less of the formula $MX_y$ wherein M is a metal selected from the group consisting of ruthenium, rhodium, iridium and osmium, X is a chalcogen selected from the group consisting of sulfur, selenium, tellurium and mixtures thereof, and y is a number ranging from about 0.1 to about 3.

2. Chalcogenides of claim 1 wherein the particle size is less than 0.05 micron.

3. Chalcogenides of claim 1 wherein the chalcogenide is sulfur.

4. Chalcogenides of claim 1 wherein the metal is ruthenium, and the chalcogenide is sulfur.

5. Chalcogenides of the formula $MX_y$ wherein M is a metal selected from the group consisting of ruthenium, rhodium, iridium and osmium, X is a chalcogen selected from the group consisting of sulfur, selenium, tellurium and mixtures thereof, and y is a number ranging from about 0.1 to about 3, prepared by mixing in the absence of aqueous protic solvent solutions of:
(a) metal salts, the metal being selected from the group consisting of ruthenium, rhodium, iridium and osmium, and
(b) sources of sulfur, selenium, tellurium ions and mixtures thereof selected from the group consisting of $Li_2X$, $Na_2X$, $K_2X$, KHX, NaHK, $(NH_4)_2X$, $(RNH_3)_2X$, $(RR'NH_2)_2X$, LiHX, $(RR'R''NH)_2X$, wherein R, R' and R'' are the same or different and are selected from the group consisting of $C_1$ to $C_{20}$ alkyl and $C_6$ to $C_{20}$ aryl groups and X is selected from the group consisting of sulfur, selenium, tellurium and mixtures thereof, at a temperature of between 0° to 400° C.

6. Chalcogenides prepared as in claim 5, further comprising the use of a nonaqueous aprotic solvent.

7. Chalcogenides prepared as in claim 5 wherein X is sulfur and selenium.

8. Chalcogenides prepared as in claim 5 wherein X is sulfur.

9. Chalcogenides prepared as in claim 5 wherein M is selected from the group consisting of ruthenium, rhodium, and iridium.

10. Chalcogenides prepared as in claim 6 wherein the nonaqueous solvent is selected from the group consisting of acetonitrile, benzonitrile, propionitrile, acetone, propylene carbonate, $C_1$–$C_{20}$ alkylhalides, $C_6$–$C_{20}$ arylhalides, 1,2-dimethoxyethane, diglyme, N-methyl formamide, dimethylformamide, $C_6$–$C_{20}$ aromatics, pyridine, sulfolane, tributylphosphate, anhydrous acids, dimethylsulfite, $C_1$–$C_{20}$ amines, $C_5$–$C_{12}$ alkanes, $C_4$–$C_8$ ethers and $C_4$–$C_8$ esters.

11. Chalcogenides prepared as in claim 5, wherein the temperature of reaction is between 25° to 300° C.

12. Chalcogenides prepared as in claim 5 wherein the anion of the metal salt is selected from the group comprising halides, sulfates, nitrates, carboxylates, perfluorocarboxylates wherein the carbonaceous moiety of the anion is a $C_1$ to $C_8$ hydrocarbon or fluorocarbon radical.

13. Chalcogenides prepared as in claim 6 wherein the nonaqueous aprotic solvent is selected from the group consisting of propylene carbonate, dimethylformamide (DMF), pyridine, acetonitrile, benzonitrite, propionitrite, 1,2-dimethoxyethane, diglyme and n-methyl-formamide.

14. Homogeneous dispersions of chalcogenides of the formula $MX_y$ wherein M is a metal selected from the group consisting of ruthenium, rhodium, iridium and osmium, X is a chalcogen selected from the group consisting of sulfur, selenium, tellurium and mixtures thereof and y is a number ranging from about 0.1 to about 3 prepared by mixing in the presence of a nonaqueous solvent selected from the group consisting of propylene carbonate, dimethylformamide (DMF), pyridine, acetonitrile, benzonitrile, propionitrile, 1,2 dimethoxyethane, diglyme and n-methylformamide solutions of:
(a) metal salts, the metal being selected from the group consisting of ruthenium, rhodium, iridium and osmium, and
(b) sources of sulfur, selenium, tellurium ions and mixtures thereof selected from the group consisting of $Li_2X$, $Na_2X$, $K_2X$NaHX, LiHX, KHX$(NH_4)_2X$, $(RNH_3)_2X$, $(RR'NH_2)_2X$, $(RR'R''NH)_2X$, wherein R, R' and R'' are the same or different and are selected from the group consisting of $C_1$ to $C_{20}$ alkyl and $C_6$ to $C_{20}$ aryl groups and X is selected from the group consisting of sulfur, selenium, tellurium and mixtures thereof, at a temperature of between 0° to 400° C.

15. The homogeneous dispersions of chalcogenides of claim 14 wherein the anion of the metal salts of (a) is selected from the group comprising halides, sulfates, nitrates, carboxylates, perfluorocarboxylates wherein the carbonaceous moiety of the anion is a $C_1$ to $C_8$ hydrocarbon or fluorocarbon radical.

* * * * *